(12) United States Patent
Vasquez (10) Patent No.: US 8,410,898 B1
(45) Date of Patent: Apr. 2, 2013

(54) NEAR FIELD COMMUNICATION BASED KEY SHARING TECHNIQUES

(75) Inventor: Juan Vasquez, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/587,096

(22) Filed: Aug. 16, 2012

(51) Int. Cl.
*G05B 19/00* (2006.01)

(52) U.S. Cl. .......................... 340/5.6; 340/5.1; 340/5.54

(58) Field of Classification Search ............ 340/5.1, 340/5.54, 5.6
See application file for complete search history.

(56) References Cited

U.S. PATENT DOCUMENTS

| | | | |
|---|---|---|---|
| 4,252,006 A | 2/1981 | Swisher | |
| 5,823,027 A | 10/1998 | Glick et al. | |
| 5,848,541 A | 12/1998 | Glick et al. | |
| 6,697,730 B2 | 2/2004 | Dickerson | |
| 6,771,981 B1 | 8/2004 | Zalewski et al. | |
| 6,820,801 B2 | 11/2004 | Kaneko et al. | |
| 6,937,141 B2 | 8/2005 | Muramatsu | |
| 6,956,467 B1 | 10/2005 | Mercado, Jr. | |
| 7,079,832 B2 | 7/2006 | Zalewski et al. | |
| 7,133,659 B2 | 11/2006 | Zalewski et al. | |
| 7,155,199 B2 | 12/2006 | Zalewski et al. | |
| 7,183,894 B2 | 2/2007 | Yui et al. | |
| 7,290,702 B2 | 11/2007 | Elberbaum | |
| 7,391,302 B2 | 6/2008 | Hsieh | |
| 7,555,286 B2 | 6/2009 | Sasakura et al. | |
| 7,900,052 B2 | 3/2011 | Jonas | |
| 2004/0030601 A1 | 2/2004 | Pond et al. | |
| 2005/0099262 A1 | 5/2005 | Childress et al. | |
| 2006/0059101 A1 | 3/2006 | Ebihara et al. | |
| 2006/0059102 A1 | 3/2006 | Ebihara et al. | |
| 2006/0059105 A1 | 3/2006 | Ebihara et al. | |
| 2006/0069652 A1 | 3/2006 | Ebihara et al. | |
| 2006/0250578 A1 | 11/2006 | Pohl et al. | |
| 2007/0160199 A1 | 7/2007 | Sekiguchi et al. | |
| 2007/0197261 A1 | 8/2007 | Humbel | |
| 2007/0200671 A1 | 8/2007 | Kelley et al. | |
| 2008/0034422 A1 | 2/2008 | Al-Azzawi | |
| 2009/0060183 A1 | 3/2009 | Kim | |
| 2009/0064744 A1 | 3/2009 | Wang | |
| 2009/0138953 A1 | 5/2009 | Lyon | |
| 2009/0183541 A1 | 7/2009 | Sadighi et al. | |
| 2009/0184800 A1* | 7/2009 | Harris ........................ | 340/5.21 |
| 2009/0266901 A1 | 10/2009 | Dinc et al. | |
| 2010/0066487 A1 | 3/2010 | Bell | |
| 2010/0204834 A1 | 8/2010 | Comerford et al. | |
| 2010/0217972 A1* | 8/2010 | Lohiniva et al. .............. | 713/153 |
| 2010/0305779 A1 | 12/2010 | Hassan et al. | |
| 2011/0095987 A1 | 4/2011 | Yoshimoto | |

* cited by examiner

*Primary Examiner* — Travis Hunnings
(74) *Attorney, Agent, or Firm* — Remarck Law Group PLC (57) ABSTRACT

A computer-implemented technique includes storing keychains in a memory of a computer. A login identifier and a password are received from a mobile device. The login identifier and the password are verified. Subsequent to the verification, one of the keychains is downloaded from the computer to the mobile device. The keychain includes N keys that are each associated with one of M physical locks of M locking devices, where N and M are integers greater than or equal to 1. The M locking devices or another locking device are monitored. Information in a key log is recorded when each of the N keys is used on one of the M locking devices or another locking device. The information includes a locking device identifier and a key identifier. The mobile device is alerted when each of the N keys is used based on the key log.

22 Claims, 6 Drawing Sheets

NEAR FIELD COMMUNICATION BASED KEY SHARING TECHNIQUES

FIELD

The present disclosure relates to physical lock entry techniques using wireless communication.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Physical keys are typically used to unlock or open doors or locks on various items. There are different types of physical keys. A traditional turn style key is typically formed of a metallic material and includes teeth. The key is inserted into a lock and turned to unlock the lock. An example of another physical key is an access card. The access card may be magnetic or programmable and have a unique electronic signature. The electronic signature is read when the card is slid through an electronic reader of a locking device attached to a lock. The electronic reader reads the unique electronic signature and unlocks the lock via the locking device. An advantage of a magnetic or programmable access card is that the electronic reader can be reprogrammed to accept a different unique electronic signature when the access card is lost or stolen.

The physical keys are often carried on a keychain, in a wallet or carry bag, copied to create additional physical keys, and/or physically shared. The physical keys may be easily lost because the keys are often small in size.

When a turn style key is lost, an owner of a lock associated with the key has basically two options. The owner may have the lock replaced or rekeyed or may leave the lock unchanged in hopes that an unauthorized user does not obtain and/or use the lost key to unlock the lock and gain access to a restricted area. Although the key is lost, the key may be used to unlock the lock when found unless the lock is changed or rekeyed. Also, other copies of the key may be used to unlock the lock. Thus, the lost key may not be cancelled (i.e. remains valid) when lost. When a previously used lock is replaced with a new lock and/or rekeyed, the keys that were used to unlock the previously used lock are now invalid (i.e. the previously used keys cannot be used to unlock the new lock or rekeyed lock). For this reason, the previously used lock and/or keys may be disposed.

Once a physical key is provided from an owner to a receiving party, the physical key remains valid and is able to unlock a lock until the lock is changed or rekeyed, or reprogrammed in the case of an access card-based locking device. If the owner wants to prevent the receiving party from unlocking the lock, the owner typically needs to request that the key be returned to the receiving party, change the lock, rekey the lock, and/or reprogram the locking device. An additional access card must be purchased and programmed when the locking device is reprogrammed.

Physical keys can be difficult to carry and to share. Also, once a key is physically shared with another party, the owner has limited ability to prevent copying of the key. For this reason, an owner may not be aware of all of the parties that have a copy of the key.

SUMMARY

A computer-implemented technique is provided and includes storing keychains in a memory of one of a computer and a server. Each of the keychains is associated with one of first mobile devices and includes keys. Each of the keys unlocks one or more physical locks. A login identifier and a password are received from a first mobile device via a control module of the one of the computer and the server. The login identifier and the password are verified via the control module. Subsequent to the control module approving the login identifier and the password, one of the keychains is downloaded from the one of the computer and the server to the first mobile device. The one of the keychains includes N keys, where N is an integer greater than or equal to 1. Each of the N keys is associated with one or more of M physical locks of M locking devices, where M is an integer greater than or equal to 1.

A key sharing request is received from the first mobile device. Keys of the one of the keychains are shared with second mobile devices based on a rank of the first mobile device and the key sharing request. The M locking devices or another locking device not included in the M locking devices are monitored via a log update module. Information is recorded in a key log via a log update module when each of the N keys is used on one of the M locking devices or another locking device by one of the first mobile devices and the second mobile devices. The information includes a mobile device identifier, a locking device identifier and a key identifier. The first mobile device is alerted when each of the N keys is used via an alert module based on the key log including reporting to the first mobile device the mobile device identifier, the locking device identifier and the key identifier.

In other features, a computer-implemented technique is provided and includes remotely logging into one of a computer and a server via a control module of a first mobile device. The logging into the one of the computer and the server includes entering a unique identifier and a password. Subsequent to the computer or the server approving the password based on the unique identifier, a keychain from one of the computer and the server is downloaded to a memory of the first mobile device. The keychain comprises N keys, where N is an integer greater than 1. Each of the N keys unlocks one or more of M physical locks, wherein M is an integer greater than or equal to 1. One of the N keys is transferred from the first mobile device to a locking device using near field communication to unlock one of the M physical locks.

In other features, a computer-implemented technique is provided and includes storing keychains in a memory of one of a computer and a server. Each of the keychains includes keys. Each of the keys unlocks one or more physical locks. A login identifier and a password are received from a first mobile device via a control module of the one of the computer and the server. The login identifier and the password are verified via the control module. Subsequent to the control module approving the login identifier and the password, one of the keychains is downloaded from the one of the computer and the server to the first mobile device. The one of the keychains includes N keys, where N is an integer greater than or equal to 1. Each of the N keys is associated with one or more of M physical locks of M locking devices, where M is an integer greater than or equal to 1. The M locking devices or another locking device not included in the M locking devices are monitored via a log update module. Information in a key log is recorded via a log update module when each of the N keys is used on one of the M locking devices or another locking device. The information includes a locking device identifier and a key identifier. The first mobile device is alerted when each of the N keys is used via an alert module based on the key log including reporting to the first mobile device the locking device identifier and the key identifier.

In other features, a computer-implemented technique is provided and includes receiving a unique identifier and a first key from a first mobile device via a lock control module of the locking device near field communication. The first key is one of multiple keys in a keychain stored in the first mobile device. The technique further includes determining whether the first key is a trusted key or a restricted key via a lock control module. A physical lock is unlocked when the first key is a trusted key via the lock control module. Verification information is requested from the first mobile device when the first key is a restricted key via a key verification module. The first key and the verification information are verified via the key verification module. The physical lock is unlocked when the first key and the verification information are valid via the lock control module.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
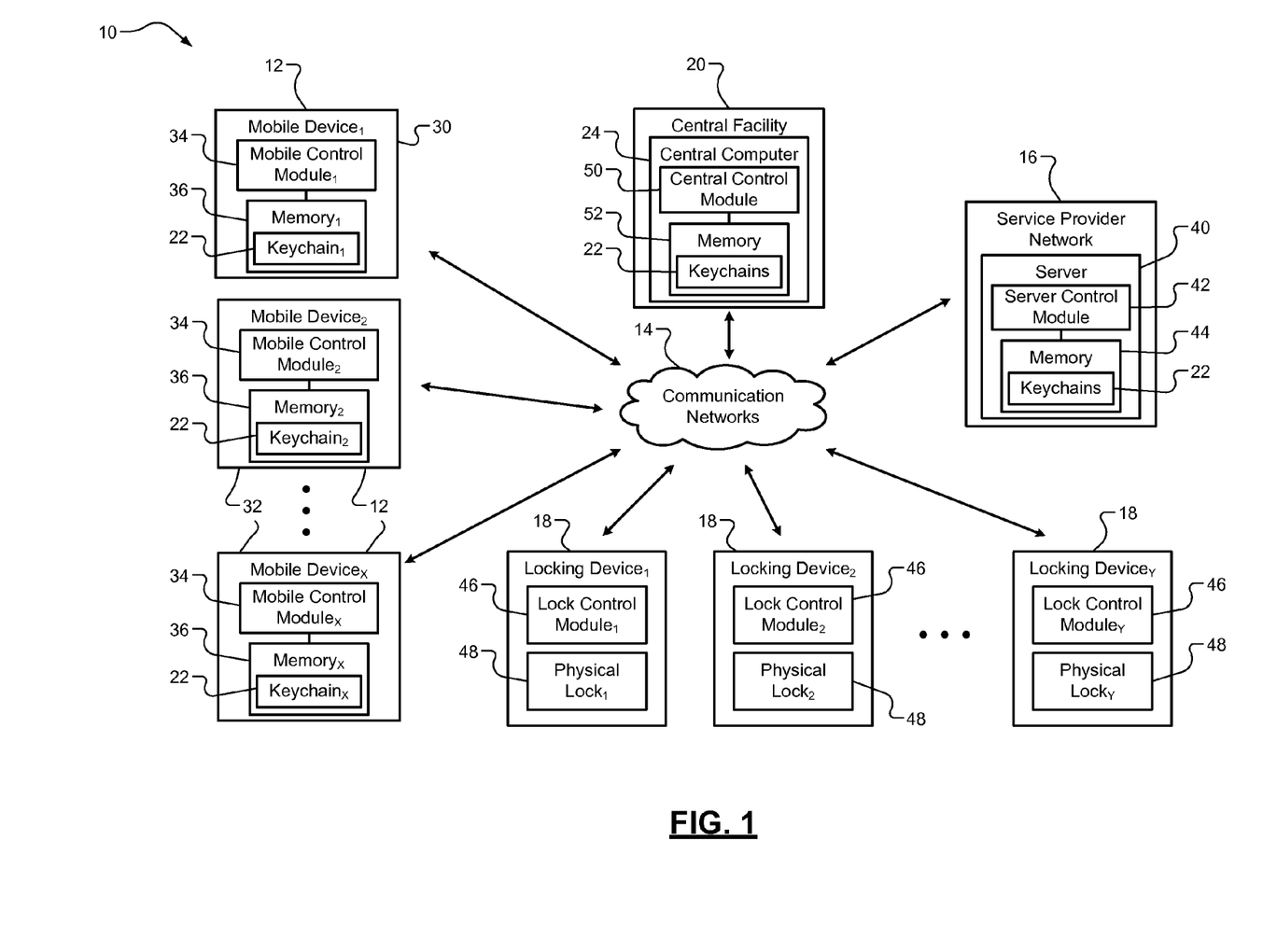
FIG. 1 is a functional block diagram of a key sharing network in accordance with the present disclosure.

In FIG. 1, a key sharing network 10 is shown. The key sharing network 10 may include mobile devices 12, communication networks 14, a service provider network 16, locking devices 18, and a central facility 20. The mobile devices 12 may be mobile phones, computers, electronic notepads, tablet computers, personal data assistants and/or other mobile devices. The mobile devices 12 may each have a keychain 22 with associated keys, which may be shared and used to unlock respective locks of the locking devices 18.

The keys are not physical keys, but rather are, for example, digital unique strings of bits and/or characters. The keys may be encrypted and may include a unique identifier, hash, certificate, alpha-numeric string, string of bits, string of characters and/or other unique credentials. The keychains 22 are not physical keychains, but rather are sets of keys generated for one or more of the mobile devices 12 and/or one or more central computer(s) (one central computer 24 is shown) of the central facility 20. The keychains 22 may be tracked by the service provider network 16 and/or central computer 24. The central computer 24 may be owned by the same owner of one or more of the locking devices 18.

The mobile devices 12 may include a first (or primary) mobile device 30 of one or more of the locking devices 18 and any number of other (or secondary) mobile devices 32. The primary mobile device 30 may be an owner device of an owner of one or more of the locking devices 18. The secondary mobile devices 32 may be, for example, mobile devices of family, friends, associates, clients, customers, and/or employees of the owner of the first mobile device 30. The mobile devices 12 may be, for example, mobile phones of customers of a hotel and/or a car rental company and used to access a hotel room or unlock a rental vehicle. The other mobile devices 32 may also include a mobile device of, for example, a bystander or someone unrelated or affiliated with the owner.

The mobile devices 12 may each include a mobile control module 34 and memory 36. The memories 36 store the respective keychains 22. Each of the mobile control modules 34 may request a keychain or keys from the service provider network 16 and/or the central computer 24. The mobile control modules 34 may communicate with the service provider network 16 and the central facility 20 via the communication networks 14. The communication networks 14 may include an Internet, base stations, satellites, gateways, computers, network stations and/or servers.

The service provider network 16 provides services to the mobile devices 12, the locking devices 18, and/or the central computer 24. The services may include key sharing services, key tracking services, mobile device verification services, and/or other services disclosed herein. The service provider network 16 may include a server 40 with a server control module 42 and a memory 44. The keychains 22 may be stored in the memory 44 and accessed by and/or provided to the mobile devices 12 based on criteria disclosed herein. The server control module 42 may control access to, update, and/or assign the keychains 22. The server control module 42 may also control access to, monitor, update, revoke, assign, limit, and/or track usage of each of the keys.

Each of the locking devices 18 may include a lock control module 46 and one or more physical locks 48. The lock control modules 46 may unlock the physical locks 48 based on keys received from the mobile devices 12. The physical locks 48 may include door locks, padlocks, desk, cabinet, chest locks, or other locks. The physical locks 48 may include ignition switches, vehicle starting switches, electronic control switches, or other locking or switching device that requires a key. The physical locks 48 may be located on or in, for example, homes, vehicles, businesses, facilities, hotel rooms, desks, bike chains, trailers, storage containers, or other lockable items. The vehicles may include automobiles, motorcycles, boats, battery powered vehicles, or other vehicles having one or more locks, locking devices or keyed devices. Keyed devices may include locks, ignition switches, vehicle activation switches, electronic start switches, or other switching devices requiring a key. The terms "lock" and "keyed device" are used interchangeably herein. A lock may refer to a keyed device and a keyed device may refer to a lock.

In use, the mobile devices 12 are placed within a near field communication (NFC) distance (e.g., less than 0.2 meters (m)) of, brought in contact with, or tapped on the locking devices 18 in order to transfer the keys to the locking devices 18. NFC includes wirelessly communicating over short-ranges at, for example, 13.56 MHz with data rates of 106-848 kbit/s. Of course, other frequencies and/or data rates may be used. In one implementation, the NFC distance is less than 4 centimeters (cm).

The central facility 20 may be, for example, a residential home or a commercial or institutional building. The central facility 20 may include the central computer 24 (or server).

The central computer 24 may: communicate with the mobile devices 12 or the service provider network 16; be used to manage, monitor, assign, track, update, revoke, share, verify, and audit the keys; modify criteria and/or key update information disclosed herein; and update other verification information disclosed herein. The criteria, the update information and the verification information are described in further detail below. The central computer 24 may include a computer control module 50 and memory 52. The memory 52 may store the keychains 22.

The central computer 24 may perform tasks performed by one of the mobile devices 12 (e.g., a master mobile device) and/or the server 40 and provide the keychains 22 to the mobile devices 12. A master mobile device may refer to one of the mobile devices 12 with a rank (or trust level) of 1 and/or be owned by an owner of one or more locking devices 18.

The key sharing network 10 may not include the service provider network 16 and/or the central facility 20. When the key sharing network 10 includes both the service provider network 16 and the central facility 20, key chain managing, monitoring, assigning, tracking, updating, revoking, sharing, verifying, and other related tasks may be performed by and/or shared between the service provider network 16 and the central facility 20.

The first mobile device 30, one of the other mobile devices 32 with sharing privileges, the central computer 24, and/or the server 40 may selectively share one or more keys of one of the keychains 22 with any one of the other mobile devices 12. The sharing privileges may be assigned by the first mobile device 30, the central computer 24, and/or the server 40. The owner of the lock for which a key is being shared may determine and assign the sharing privilege via the first mobile device 30, one of the other mobile devices 32, and/or the central computer 24. The sharing privileges may be different for different mobile devices. The sharing privileges may be assigned based on a rank of the mobile device sharing the key and/or the rank of the mobile device receiving the key.

As an example, a rank of 1 may be assigned to a master mobile device. The master mobile device may receive the key and have unlimited use of the key. A rank of 2 may be assigned to a mobile device of a friend, family member, associate, or employee of the owner of the lock. The mobile devices with a rank of 2 may receive the key and have limiting sharing rights. A rank of 3 may be assigned to a mobile device of a client or customer of the owner of the lock. The mobile devices with a rank of 3 may receive the key, have restricted use of the key, and may not share the key. A rank of 4 may be assigned to a mobile device of a bystander or person not affiliated with the owner of the lock. The mobile devices with a rank of 4 may receive the key and have, for example, one-time use of the key and may not share the key.

Figure 2:
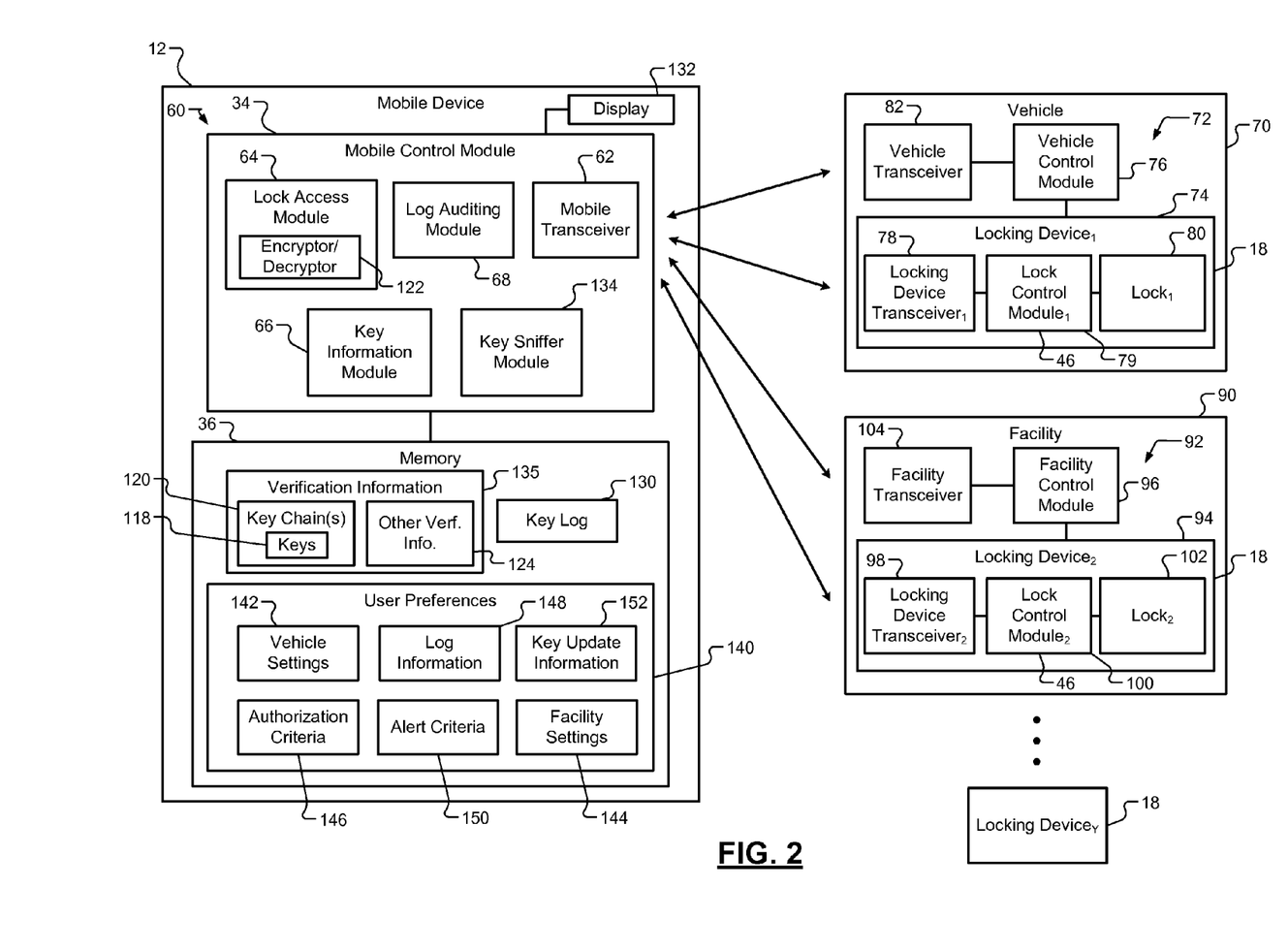
FIG. 2 is a functional block diagram of a mobile device of the key sharing network of FIG. 1.

Referring now also to FIG. 2, one of the mobile devices 12 is shown. The mobile device 12 may be a mobile device of an owner of one or more locking devices 18. As an alternative, the mobile device 12 may be a mobile device that has received one or more keys shared by a mobile device or a central computer of the owner of the one or more locking devices 18. The mobile device 12 includes a mobile network 60 with the mobile control module 34 and the memory 36. The mobile control module 34 may include the memory 36 or the memory 36 may be separate from the mobile control module 34, as shown. Each of the mobile devices of the key sharing network 10 may include the modules and the memory shown in FIG. 2.

The mobile control module 34 includes a mobile transceiver 62, a lock access module 64, a key information module 66, and a log auditing module 68. The mobile control module 34 may directly communicate with the locking devices using NFC via the mobile transceiver 62. The mobile control module 34 communicates with the service provider network 16 and/or the central computer 24 via the mobile transceiver 62 over one or more of the communication networks 14 via the mobile transceiver 62.

The lock control modules 46 associated with the locking devices 18 may include modules within and/or external to the locking devices 18. As an example, a vehicle 70 is shown that includes vehicle network 72 with a locking device 74 and a vehicle control module 76. The locking device 74 includes a locking device transceiver 78 and a lock control module 79, which actuates a physical lock 80. The lock control module 79 communicates with the mobile control module 34 via the locking device transceiver 78, which may be included in the lock control module 79. The vehicle control module 76 controls operations of the vehicle 70 and is in communication with the locking device 74 and/or the mobile device 12. The vehicle control module 76 may be a powertrain control module, an interior control module or other vehicle control module. The vehicle control module 76 may communicate with the mobile control module 34 via a vehicle transceiver 82.

The NFC communication between the mobile control module 34 and the locking devices 18 may be used initially to unlock the locks and to initiate wireless connections of other wireless communication protocols, such as a Bluetooth connection or a Wi-Fi connection. The mobile control module 34 may communicate with the locking devices 18 and/or control modules (e.g., the control modules associated with the locking devices using the other wireless communication protocols.

The Bluetooth connection may be used, for example, to sink personal information from the mobile device to the vehicle network, such as seat settings, temperature settings, radio settings (e.g., radio station and volume settings), powertrain or suspension settings (e.g., an economy or sport setting), or other vehicle settings. These setting may be stored in the memory 36 as vehicle settings. The vehicle control module 76 may than adjust settings to match the vehicle settings received from the mobile device after the mobile device is used to unlock a lock on a door and/or switch ON an ignition or starter switch of the vehicle 70.

As another example, a facility 90 is shown that includes a facility network 92 with a locking device 94 and a facility control module 96. The locking device 94 includes a locking device transceiver 98, a lock control module 100, which actuates a physical lock 102. The lock control module 100 communicates with the mobile control module 34 via the locking device transceiver 98, which may be included in the lock control module 100. The facility control module 96 controls operations of electrical networks in the facility 90 and is in communication with the locking device 94 and/or the mobile device 12. The facility control module 96 may communicate with the mobile control module 34 via a facility transceiver 104.

A Wi-Fi connection with the facility control module 96 may be established when the mobile device 12 is used to unlock a door of the facility. The Wi-Fi connection may be used, for example, to sink personal information from the mobile device to a facility network (e.g., a home, commercial, or institutional network). The personal information may include, for example, temperature settings, television or stereo settings, light settings or other facility settings. The facility control module 96 may then adjust settings to match the settings received from the mobile device 12.

The lock access module 64 communicates with the locking devices 18 via the mobile transceiver 62. The mobile control module 34, the memory 36 and the mobile transceiver 62 may be implemented as part of a single integrated circuit (IC) or may each be ICs and incorporated in single system-in-a-package (SIP). As an example, the mobile transceiver 62 or a portion of the mobile transceiver 62 may be separate from the mobile control module 34 and include a NFC chip for communicating with the locking devices 18 within a NFC distance.

The lock access module 64 may access keys 118 of one or more keychains 120 stored in the memory 36. The lock access module 64 may then provide one or more of the keys 118 to a locking device to unlock a lock of the locking device and obtain access to a restricted area. The keys 118 stored in the memory 36 may be encrypted or decrypted via an encryption and decryption module 122 prior to being provided to the locking device.

The key information module 66 may be used when the locking device is requesting additional verification information 124 in addition to the key(s), such as, for example, a password, a passcode, a pin (e.g., string of characters or bits), or other personal, account and/or credential information. The additional verification information 124 may be stored in the memory 36 and used to verify whether the mobile device 12 is authorized to access a restricted area associated with a lock. As an alternative, the key information module 66 may contact the server 40 to obtain the additional verification information 124. The server 40 may verify the mobile device 12 and then provide the additional verification information 124 to the key information module 66.

When verifying the mobile device 12, the server 40 may request information from the mobile device 12, such as a unique identifier of the mobile device 12, a username and/or password of a user of the mobile device 12, an account identifier, and/or other personal information. Once the requested information is approved by the server 40, the server 40 transmits the additional verification information 124 to the mobile device 12. The key information module 66 may forward the additional verification information 124 from the server 40 to the locking device to obtain access to the restricted area. The locking device may request the additional verification information 124 to verify that a key provided by the mobile device 12 has not been revoked.

The log auditing module 68 may be used to monitor: which of the mobile devices of the key sharing network 10 are using the keys 118 of the mobile device 12; which of the keys 118 each of the mobile devices are using; when each of the keys 118 are used, how often each of the keys 118 are used; and whether access to the restricted areas associated with each of the keys 118 was provided when the keys 118 were used. A key log 130 of this information may be stored in the memory 36 and/or stored in the server 40 and/or the central computer 24. The server 40 and/or the central computer 24 may wirelessly communicate with and monitor the locks associated with the keys 118 and maintain the key log 130. The key log 130 may be associated with an account of the owner of the mobile device 12 and/or of one or more locking devices of the owner. The key log 130 or a portion thereof may be transmitted from the server 40 and/or the central computer 24 to the mobile device 12 and displayed to a user on the mobile device. The key log 130 may be displayed via a display 132, such as a touch screen, on the mobile device 12.

The mobile control module 34 may further include a key sniffer module 134. The key sniffer module 134 may use NFC to read a card (or physical key), memory device, and/or other device storing a key. The key sniffer module 134 may copy and/or store the key in the memory 36 as one of the keys 118 and use the key to unlock a locking device associated with the key. This allows a user to discard, for example, a card having the key and use the mobile device 12 to access a restricted area associated with the locking device.

The memory 36 stores verification information 135 including the keychain(s) 120 with respective sets of keys 118. The keychains 120 and/or the keys 118 may not be directly accessible to a user of the mobile device 12. In other words, a user of the mobile device 12 may be able to use the keys 118 via the mobile device 12 to unlock locks, but the keys 118 may not be displayed for the user to see on the mobile device 12. If the keys are not displayed on the display 132, the user is unable to directly see and copy the keys 118. As an alternative, the keys 118 may be displayed (e.g., on a master mobile device) to allow the owner of the mobile device 12 to directly see and copy and/or provide the key to another user. The mobile device 12 may be instructed by the user to copy and/or share the keys 118 with other mobile devices. The keys 118 may be copied and shared without displaying the keys 118 to the user.

The memory 36 also stores user preferences 140. The user preferences 140 may include the vehicle settings 142, the facility settings 144, authorization criteria 146, log information 148, alert criteria 150 and key update information 152. The authorization criteria 146 may be provided by the mobile device 12 to the server 40 and/or to one of the locking devices 18. Alternatively, the server 40 may provide the authorization criteria 146 to one or more of the locking devices 18. The authorization criteria 146 indicate verification information requirements to unlock a lock. The authorization criteria 146 and may include determining whether the mobile device 12 or other mobile devices of the key sharing network 10 provide the correct keys and/or additional verification information.

The authorization criteria 146 may be based on the rank of the mobile device 12. An example of some ranks is disclosed above. When the rank of the mobile device 12 is 1, a locking device may, for example, trust the mobile device 12, unlock a lock and provide access without requesting additional verification information from the mobile device 12. When the rank is equal to 2, 3, or 4 or is not equal to 1, the locking device may request additional verification information from the mobile device 12 prior to unlocking the lock. Examples of some additional verification information are disclosed above.

The mobile control module 34 and/or log auditing module 68 may determine log information for the server 40 and/or central computer 24 to track and report. The mobile control module 34 and/or log auditing module 68 may transmit the log information to the server 40 and/or central computer 24 via the mobile transceiver 62. The log information indicates what information to track and store in the key log 130. The log information may include: key identifiers, when a key is used, identification of a mobile device that used a key; how many times a key was used in a predetermined period; how many times a mobile device used a key within a predetermined period; identification of mobile devices that used an outdated or incorrect key, and/or other user and/or service provider defined log information.

The mobile device 12 may determine and store the alert criteria 150 in the memory 36. The alert criteria 150 may indicate when the server 40 and/or the central computer 24 are to alert the mobile device 12 of tracked log information. The mobile device 12 may set the alert criteria 150 based on user inputs and transmit the alert criteria 150 to the server 40 and/or the central computer 24.

The alert criteria 150 may include: sending an alert each time a key is used; when a key is used by a mobile device with a rank greater than a predetermined rank; when an outdated key is used; when a key is used that was not previously assigned to a mobile device using the key, the server 40 and/or the central computer 24; when a key is used for an incorrect locking device; and/or other user and/or service provider defined criteria.

The mobile control module 34 and/or key information module 66 may provide the key update information 152 to the server 40 and/or the central computer 24. The key update information 152 may include: how often to update each of the keys 118; which ones of the keys 118 to update and not to update; whether to update each of the keys 118 stored in respective locking devices and/or in mobile devices of the key sharing network 10; and/or other user and/or service provider defined key update information.

Figure 3:
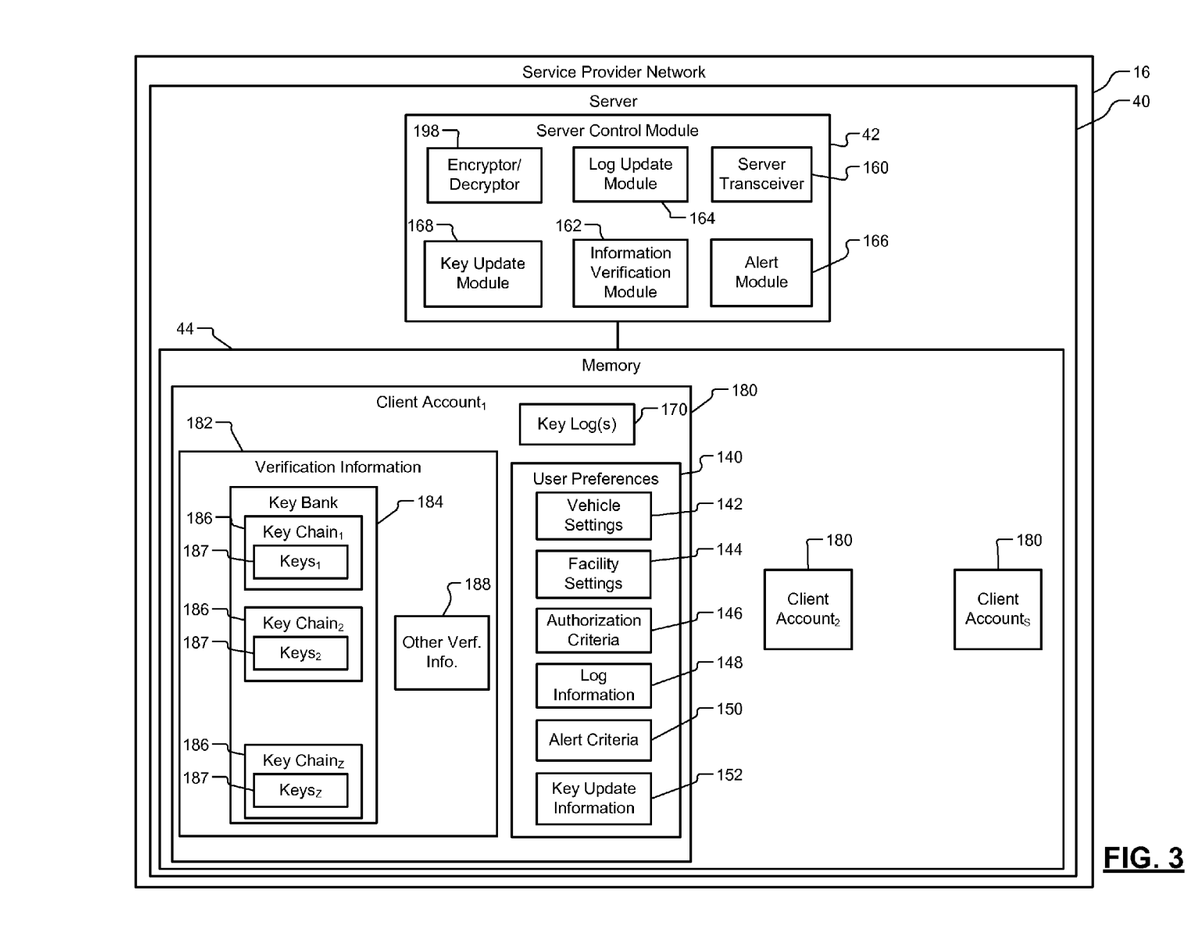
FIG. 3 is a functional block diagram of a service provider network of the key sharing network of FIG. 1.

Referring now also to FIG. 3, the service provider network 16 is shown. The service provider network 16 may be a cloud computing network and includes the server 40. The server 40 may include a server control module 42, which may include a server transceiver 160, an information verification module 162, a log update module 164, an alert module 166, a key update module 168, and/or the memory 44. The memory 44 may be separate from the server control module 42, as shown. The server 40 communicates with the mobile devices 12, the locking devices 18, and the central computer 24 via the server transceiver 160. Although the service provider network 16 is shown as including a single transceiver and a single server, the server provider network 16 may include any number of transceivers and servers providing the services disclosed herein.

The server control module 42 may control the transfer of keys, other verification information, and/or user preferences between the server 40 and the mobile devices 12, between the server 40 and the locking devices 18, and between the server 40 and the central computer 24. The other verification information and user preferences may include the additional (or other) verification information 124 and user preferences 140 disclosed above.

The information verification module 162 may be used to determine whether additional verification information, such as keys, passwords, usernames, passcodes, pins and/or other verification information provided by a mobile device to a locking device is correct. For example, one of the locking devices 18 may request an update with regard to verification information for a particular mobile device, which has provided a key or unique identifier to the locking device. The information verification module 162 may provide the requested information and/or instruct the locking device to request additional verification information from the mobile device. The locking device may then transfer the additional verification information from the mobile device to the server 40. The server 40 may verify the additional verification information received based on the authorization criteria 146 and respond back to the locking device indicating whether the mobile device is authorized to unlock a lock of the locking device.

The information verification module 162 may generate and/or provide the authorization criteria 146 to selected ones of the mobile devices 12, the locking devices 18, and/or the central computer 24. By providing the authorization criteria 146 to selected mobile devices, the selected mobile devices may provide the verification information along with the key or unique identifier when initially communicating with a locking device. By providing the authorization criteria 146 to the locking devices 18, the locking devices 18 may verify information received from a mobile device without contacting the server 40. By providing the authorization information to the central computer 24, the central computer 24 may be contacted by the locking devices 18 to verify information transmitted from the mobile devices 12 to the locking devices 18.

In use, the information verification module 162 may receive a key from a locking device (e.g., one of the locking devices 18) and a mobile device identifier and compare the key to keys in a keychain of the mobile device associated with the mobile device identifier. The information verification module 162 transmits via the server transceiver 160 a verification response signal to the locking device based on the comparison. In a similar manner the information verification module 162 may receive other verification information from the locking device, compare the information to corresponding information stored in the memory 44 and send a verification response signal back to the locking device.

The log update module 164 updates log entries in key log(s) 170 based on the log information 148 stored in the memory 44. Examples of log information and/or corresponding log entries are disclosed above. The log update module 164 may update the key log 170 based on log information received from the mobile devices 12 and/or from the central computer 24. The log update module 164 may monitor one or more of the locking devices 18. The locking devices 18 may transmit log information to the server 40 when a key is used to allow the log update module 164 to track the log information. The log update module 164 may periodically request log information from the locking devices 18 regardless of whether a key has been used.

Not all of the information stored in a key log 170 for one of the mobile devices 12 and/or the central computer 24 may be sent to the mobile device. A subset of the log information tracked and stored in the key log 170 may be transmitted to the mobile device and/or the central computer 24. For example, the mobile device and/or the central computer 24 may request a subset of the log information tracked. As another example, certain log entries may be monitored by the central computer 24 and not by the mobile devices 12 and vice versa.

The alert module 166 may generate an alert (or notification) signal based on the alert criteria 150 disclosed above. The alert signal may be transmitted to one or more of the mobile devices 12 and the central computer 24 at which an owner of one or more of the locking devices 18 is logged into. The alert module 166 may receive a key usage signal from one of the locking devices 18 when a key and/or unique identifier is received at the locking device. The key usage signal may include: the key; a unique identifier of the mobile device that used the key; a unique identifier of the locking device; whether the locking device provided access when the key was received at the locking device; or other key, mobile device and/or locking device related information.

The alert module 166 generates the alert signal when the key usage signal, information in the key usage signal, and/or information updated based on the key usage signal satisfy the alert criteria 150. The alert signal may: be from a short message service (SMS); include text; an email message; a video and/or audio message; or other suitable message, which may be conveyed to a user at a mobile device and/or the central computer 24.

The key update module 168 periodically or after each predetermined period updates the keys in the keychains based on the key update information 152. When updating a key, the key update module 168 may modify the key or replace the key with a different key. The key update module 168 may transmit the key update information 152 to a locking device or one or more of the mobile devices 12. The key update module 168 may provide the updated keys to a mobile device when the mobile device is powered up, requesting a keychain, and/or at another suitable time.

The memory 44 stores client accounts 180 and corresponding verification information 182, the corresponding key log(s) 170, and user preferences. The verification information 182 includes a key bank (i.e. portion of the memory 44) 184 with one or more keychain(s) 186 and other verification information 188, such as passwords, usernames, passcodes, pins, or other personal or credential information. Each of the keychains includes respective keys 187. The key log(s) 170 include the log entries for the corresponding log information 148. The server control module 42 may manage each of the client accounts 180 and corresponding verification information, key log(s) and user preferences. This may include: setting up the client accounts; verifying client information when a client via one of the mobile devices 12 and/or the central computer 24 accesses a client account; and controlling the updating, modifying, and distributing of keys and/or information associated with each of the client accounts 180.

The keychains 186 stored in the memory 44 may be owner and/or user specific and/or mobile device specific. In other words, each of the keychains 186 may be assigned to (i) a single owner or user of the locks associated with the keys in the keychain or (ii) a single mobile device. An owner and/or user may have multiple mobile devices. Each of the mobile devices of the owner and/or user may have a different keychain. The keychains may have one or more of the same keys and one or more different keys. An owner and/or user may have a key sharing (or client) account at the service provider network 16 and/or server 40. The key sharing account may have one or more keychains. Each keychain may be assigned to one or more mobile devices of the owner and/or user. The keychains may be associated with an identifier of a networking account, such as a social or information sharing network account and may be shared using the networking account. The owner and/or user may log into the key sharing account and/or the networking account from any one of the mobile devices 12 and/or the central computer 24 and obtain access to their keychains, key log, and/or the other account information disclosed herein, which is stored at the server 40.

The server control module 42 may also include an encryptor and/or decryptor 198 for encrypting and/or decrypting keys and other verification information transmitted between (i) the server control module 42 and the mobile devices 12, (ii) the server control module 42 and the central computer 24, and/or (iii) the server control module 42 and the locking devices 18.

Figure 4:
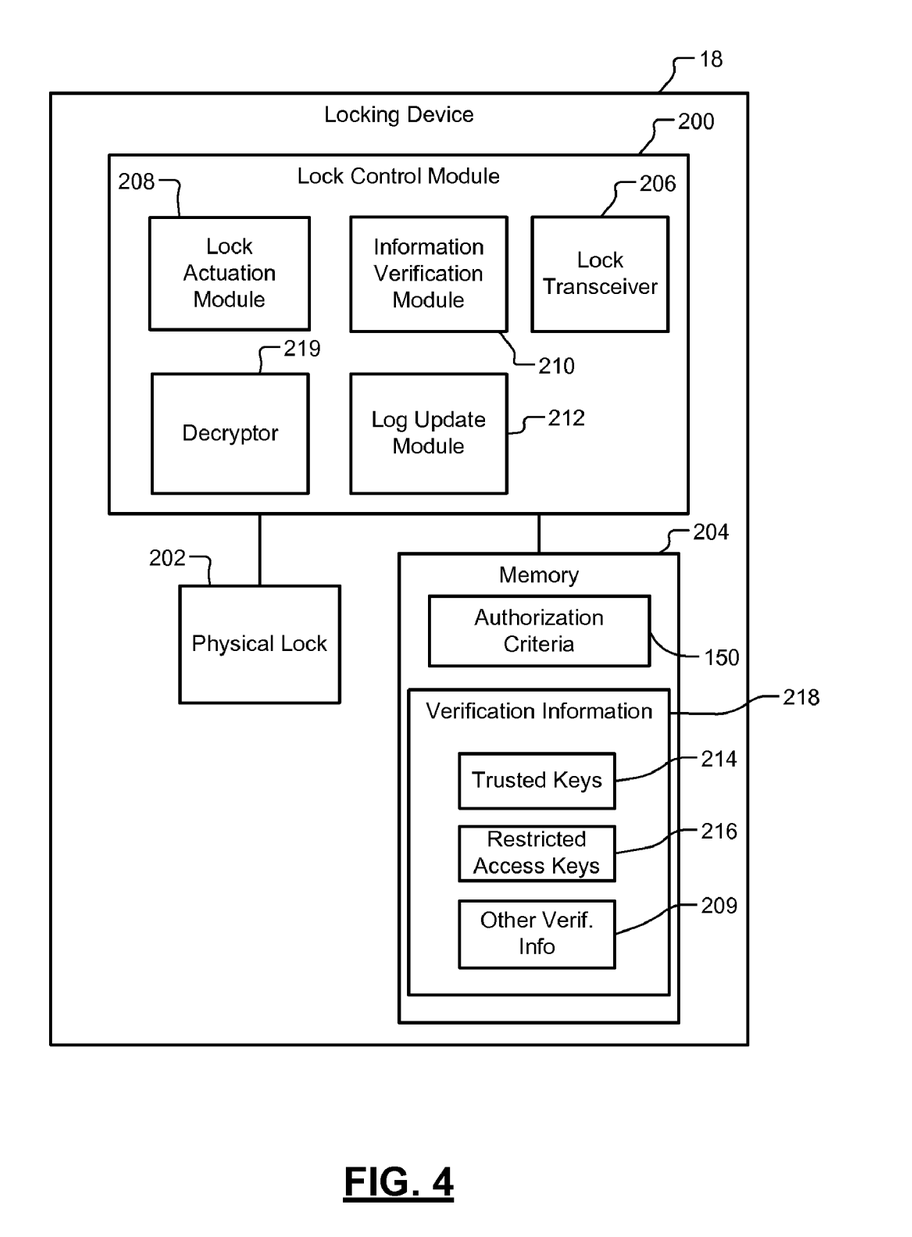
FIG. 4 is a functional block diagram of a locking device of the key sharing network of FIG. 1.

Referring now also to FIG. 4, one of the locking devices 18 is shown. The locking device 18 includes a lock control module 200, a physical lock 202 and a memory 204. The lock control module 200 may include the memory 204 or the memory 204 may be separate from the lock control module 200, as shown. The other locking devices of the key sharing network 10 may include modules, a physical lock (or physical keyed device) and a memory similar to the modules, physical lock and memory of the locking device 18.

The lock control module 200 may include a lock transceiver 206, a lock actuation module 208, an information verification module 210, and a log update module 212. The lock control module 200 communicates with the mobile devices 12, the server 40 and/or the central computer 24 via the lock transceiver 206. The locking device 18 may communicate with the mobile devices 12 using NFC. The locking device 18 may use a wireless communication protocol, such as Wi-Fi, and/or a cellular network to communicate with the server 40 and/or the central computer 24.

The lock actuation module 208 controls actuation of the physical lock 202 including locking and unlocking the lock 202 and/or changing the state of the lock 202 (e.g., when the lock 202 is a switch). The lock actuation module 208 may include electrical and mechanical components to unlock the lock 202. The lock control module 200 controls actuation of the lock 202 based on the key(s) and/or other verification information 209 received from a mobile device. Examples of other verification information are disclosed above. The lock control module 200 maintains the lock 202 in a locked (or first) state or transitions the lock 202 to an unlocked (or second) state based on the key(s) and/or the other verification information 209.

When the rank of a mobile device accessing the locking device 18 is 1, the lock control module 200 may, for example, trust the mobile device and provide access without requesting additional information. When the rank of the mobile device is equal to 2, 3, or 4 or is not equal to 1, the lock control module 200 may request additional information from the mobile device attempting to unlock the lock 202.

The information verification module 210 may be used to verify whether a key received from one of the mobile device(s) is up to date and/or valid. The information verification module 210 may also verify keys received from the mobile devices with trusted keys 214 and/or restricted access keys 216 stored in the memory 204 of the locking device 18 and/or request verification of the keys by the server 40. When the key is a restricted access key, the information verification module 210 may request additional information from a mobile device that transmitted the key. The information verification module 210 may forward a key received from a mobile device to the server 40. This may be performed when the key is a trusted or restricted access key. The server 40 may check whether the key is updated and/or valid and respond back to the locking device 18 accordingly. The lock actuation module 208 may unlock the lock when the key is verified as being updated and valid.

The locking device 18 upon receiving a key and/or a unique identifier from the mobile device may request additional verification information from the mobile device and verify the additional verification information against information stored in the memory 204 of the locking device 18 and/or verify the additional verification information with the server 40.

The log update module 212 may transmit log information to the server 40 and/or the central computer 24 when a key is used to allow the log update module 212 of the server 40 to track the log information. The log update module 212 may transfer the log information periodically, every predetermined period, and/or when requested from the server 40 and/or the central computer 24.

The memory 204 may store the authorization criteria 146 and/or verification information 218. The verification information 218 may include the trusted keys 214, the restricted access keys 216, and/or the other verification information 209 disclosed herein. The lock actuation module 208 and/or the information verification module 210 may compare key(s) received from one of the mobile devices 12 with the keys 214, 216. When there is a match, the lock actuation module 208 may unlock the lock 202.

The lock control module 200 may also include a decryptor 219 for decrypting keys and other verification information transmitted between (i) the lock control module 200 and the mobile devices 12, (ii) the lock control module 200 and the central computer 24, and/or (iii) the server control module 42 and the locking devices 18.

Figure 5:
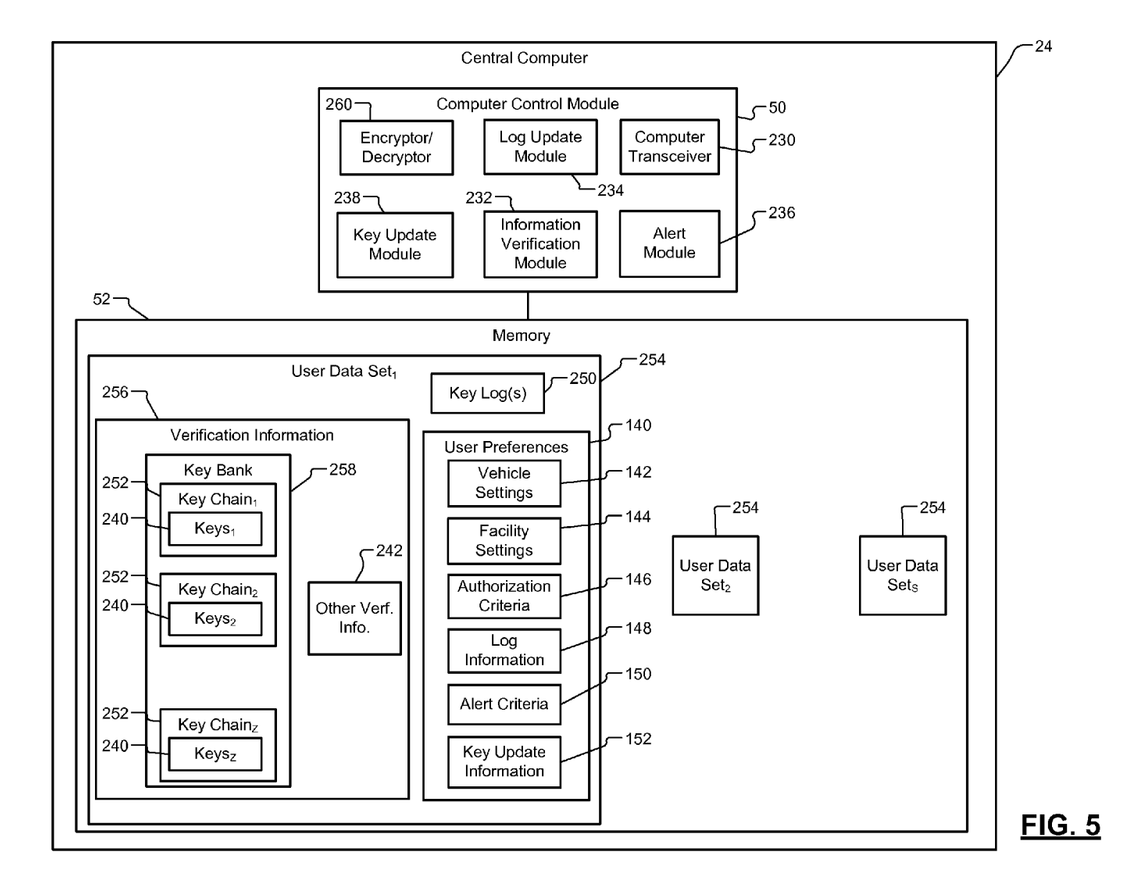
FIG. 5 is a functional block diagram of a central computer of the key sharing network of FIG. 1.

Referring now to FIG. 5, the central computer 24 is shown. The central computer 24 includes the computer control module 50 and memory 52. The computer control module 50 may include the memory 52 or the memory 52 may be separate from the computer control module 50, as shown. The computer control module 50 may include a computer transceiver 230, an information verification module 232, a log update module 234, an alert module 236, a key update module 238, and/or the memory 52. The computer control module 50 communicates with the mobile devices 12, the locking devices 18, and/or the server 40 via the computer transceiver 230. Other central computer(s) of the central facility 20 may include similar modules and memory as the central computer 24.

The computer control module 50 may perform some of the tasks performed by the mobile control modules 34 of the mobile devices 12 and/or may perform the tasks performed by the server 40. As an example, the computer control module 50 may provide the user preferences 140 including the settings 142, 144, authorization criteria 146, log information 148, alert criteria 150, and/or key update information 152 to the server 40. The user preferences 140 may be based on user inputs received at the central facility 20 and/or received from the mobile devices 12. The computer control module 50 may control the transfer of keys 240 and other verification information 242 between the central facility 20 and the mobile devices 12, between the central facility 20 and the locking devices 18, and between the central facility 20 and the server 40.

The information verification module 232 may be used to determine whether verification information provided by a mobile device to a locking device is correct. For example, one of the locking devices 18 may request an update with regard to verification information for a particular mobile device, which has provided a key or unique identifier to the locking device. The information verification module 232 may provide the requested information and/or instruct the locking device to request additional verification information from the mobile device. The locking device may then transfer the additional verification information from the mobile device to the computer control module 50. The computer control module 50 may verify the additional verification information received based on the authorization criteria 146 and respond back to the locking device indicating whether the mobile device is authorized to unlock a lock of the locking device.

The information verification module 232 may generate and/or provide the authorization criteria 146 to selected ones of the mobile devices 12, the locking devices 18, and/or the server 40. By providing the authorization information to the server 40, the server 40 may be contacted by the locking devices 18 to verify information transmitted from the mobile devices 12 to the locking devices 18.

In use, the information verification module 232 may receive a key from a locking device and a mobile device identifier and compare the key to keys in a keychain of the mobile device. The information verification module 232 transmits via the computer transceiver 230 a verification response signal to the locking device based on the comparison. In a similar manner, the information verification module 232 may receive the other verification information 242 from the locking device, compare the information to corresponding information stored in the memory 52 and send a verification response signal back to the locking device.

The log update module 234 updates log entries in key log(s) 250. Examples of log entries associated with log information are disclosed above. The log update module 234 may update the key logs 250 based on log information received from the mobile devices 12 and/or from the server 40. The log update module 234 may monitor one or more of the locking devices 18. The locking devices 18 may transmit log information to the computer control module 50 when a key is used to allow the log update module 234 to track the log information 148. The log update module 234 may periodically request log information from the locking devices 18 regardless of whether a key has been used.

Not all of the information stored in the key logs 250 for one of the mobile devices 12 and/or the memory 52 may be sent to the mobile device. A subset of the log information tracked and stored in the key logs 250 may be transmitted to the mobile devices 12 and/or the server 40. For example, the mobile devices 12 and/or server 40 may request a subset of the log information tracked. As another example, certain log entries may be monitored by the computer control module 50 and not by one of the mobile devices 12 and vice versa.

The alert module 236 may generate an alert (or notification) signal based on the alert criteria 150 disclosed above. The alert signal may be transmitted to one or more of the mobile devices 12. The alert module 236 may receive a key usage signal from one of the locking devices 18 when a key and/or unique identifier is received at the locking device. The key usage signal may include: the key; a unique identifier of the mobile device that used the key; a unique identifier of the locking device; whether the locking device provided access when the key was received at the locking device; or other key, mobile device and/or locking device related information.

The alert module 236 generates the alert signal when the key usage signal, information in the key usage signal, and/or information updated based on the key usage signal satisfy the alert criteria 150. The alert signal may include text, an email message, a video and/or audio message, or other suitable message, which may be conveyed to a user at the mobile device.

The key update module 238 is used to periodically or each predetermined period update the keys 240 in keychains 252 based on the key update information 152. When updating a key, the key update module 238 may modify the key or replace the key with a different key. The key update module 238 may transmit the updated information to a locking device or one or more of the mobile devices 12. The key update module 238 may provide the updated keys to a mobile device when the mobile device is powered up, requesting a keychain, and/or at another suitable time.

The memory 52 stores user data sets 254 and corresponding verification information 256, the corresponding key log(s) 250, and the user preferences 140. The verification information 256 includes a key bank 258 (i.e. portion of the memory) with one or more of the keychain(s) 252 and the other verification information 242, such as passwords, usernames, passcodes, pins, or other personal or credential information. The key log(s) 250 include the log information 148. The computer control module 50 may manage each of the user data sets 254 and corresponding verification information, key log(s) and user preferences. This may include: setting up the user data sets; verifying user information when a user via one of the mobile devices 12 and/or the central computer 24 accesses a user data set; and controlling the updating, modifying, and distributing of keys and/or information associated with each of the user data sets.

The computer control module 50 may also include an encryptor and/or decryptor 260 for encrypting and/or decrypting keys and other verification information transmitted between (i) the computer control module 50 and the mobile devices 12, (ii) the computer control module 50 and the central computer 24, and/or (iii) the computer control module 50 and the locking devices 18.

Additional Limited Access Techniques

A master mobile device (e.g., one of the mobile devices 12) and/or the central computer 24 may limit access to certain ones of the other mobile devices 12 for a limited access period. For example, the master mobile device or the central computer 24 may request that the server 40 provides a second mobile device with a key to unlock a lock of a locking device. As an alternative, the master mobile device or the central computer 24 may directly transmit a key for the locking device from the master mobile device to the second mobile device.

The master mobile device and/or the central computer 24 may limit the number of times, the number of times within a predetermined period, and/or the dates and/or times that the second mobile device may unlock the lock. The key provided to the second mobile device may be valid for the limited access period. As a lock of a locking device may have multiple keys and/or be modified, a master key may remain valid when a key provided to the second mobile device is no longer valid. The master mobile device may store and/or have access to the master key.

Revoking Access Techniques

A master mobile device and/or the central computer 24 directly and/or via the server 40 may revoke access to a restricted area. The master mobile device and/or the central computer 24 may revoke one or more keys provided to other mobile devices when certain conditions are satisfied. A user of the master mobile device and/or the central computer 24 may set a date and time that the key is to be revoked and/or may request that the key is immediately revoked. For example, a key may be revoked when a limited access period is up, the key has been used a predetermined number of times, the key is used by an unauthorized mobile device, and/or the key is provided to a locking device that does not have a lock which can be unlocked using the key. The server 40 may indicate to the locking device that the key received by the locking device is invalid (may be referred to as active revocation). Certain keys of a keychain may be revoked after a predetermined period of time or number of uses (referred to as passive revocation). A key may be pulled from a signal keychain, from a set of keychains, or from every keychain that the key is on.

One-Time Access Techniques

In another implementation, an authorized user (or owner) may obtain access to a restricted area (e.g., interior of vehicle), when the authorized user's mobile device is locked inside of the restricted area. The authorized user may find a person (bystander) with a mobile device that includes a mobile network as disclosed above. The mobile device may contact the server 40 and/or the central computer 24 and provide information, such as a password and username provided by the authorized user. The server 40 and/or central computer 24 may transmit a key to the mobile device to unlock a lock associated with the restricted area. The key provided may be a one-time key that may be used one time to unlock the lock. Once used the key may be invalid (i.e. can no longer be used to unlock the lock) by the mobile device of the bystander.

Verification information provided by the server 40 and/or the central computer 24 to one of the mobile devices may be one-time verification items, such as one-time passwords, one-time pins, and/or one-time passcodes. The one-time verification items may only be used once to access the restricted area. Once one-time verification items may be invalid. The one-time verification items may be different than and/or variations of a master key.

Locking Device Setup Techniques

A locking device may be setup for a key of a mobile device by placing the mobile device within a NFC distance of the locking device and/or distance appropriate for communication between the locking device and the mobile device. The mobile device may instruct the locking device to learn the key of the mobile device. As an alternative, the mobile device may request a key from the locking device to learn the key of the locking device. As yet another alternative, the locking device and/or the mobile device may communicate with the server 40 or the central computer 24 to request the key. The key may be initially stored and/or generated by the locking device, the mobile device, the server 40 or the central computer 24. The key may then be shared with the other ones of the locking device, the mobile device, the server 40 and/or the central computer 24.

The networks disclosed herein may each be identified as a system. For example, the key sharing network 10, the mobile network 60, the vehicle network 72 and the facility network 92 may be identified respectively as a key sharing system, a mobile system, a vehicle system and a facility system.

Figure 6:
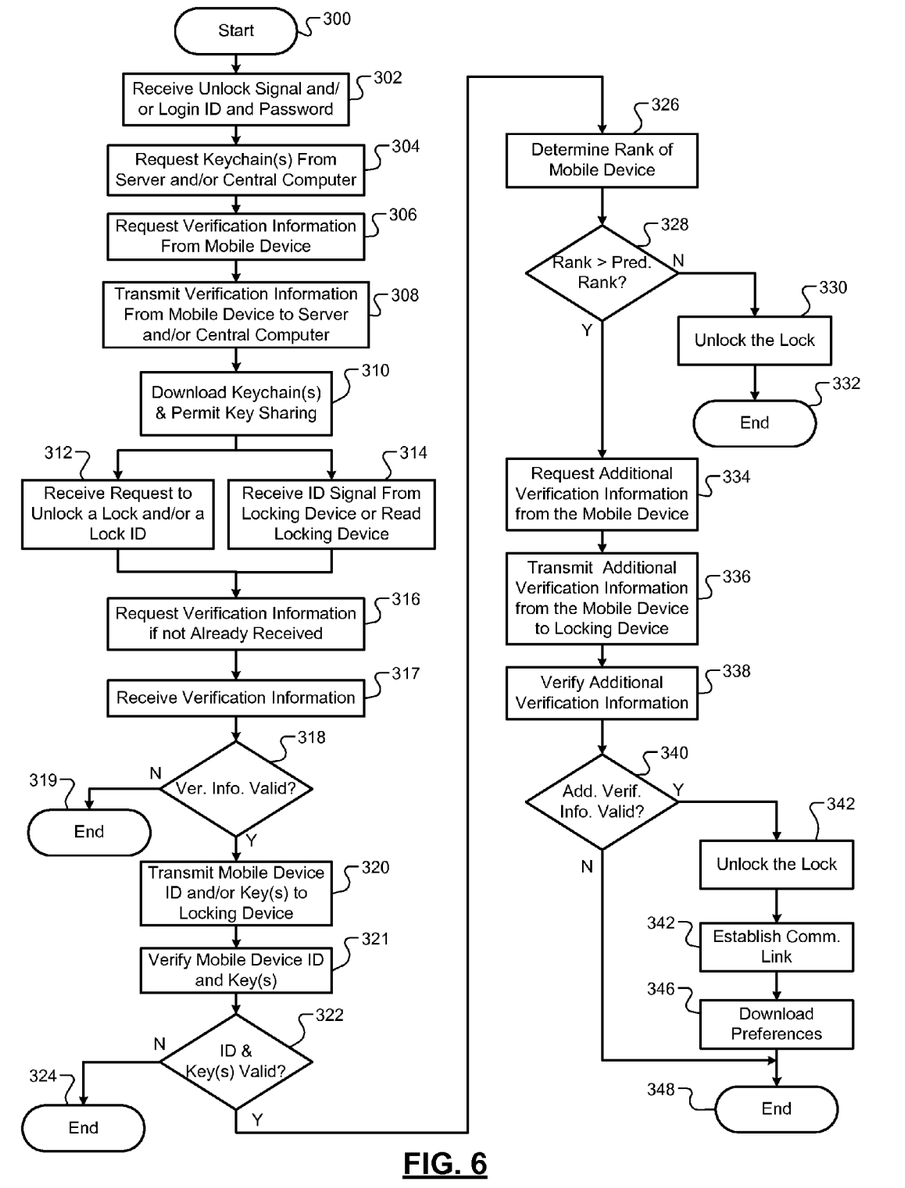
FIG. 6 illustrates a key sharing technique in accordance with the present disclosure.

The above-described key sharing network 10 may be operated using numerous techniques, an example technique (or computer-implemented method) is provided in FIG. 6. In FIG. 6, a key sharing technique is shown. Although the following tasks are primarily described with respect to the implementations of FIGS. 1-5, the tasks may be easily modified to apply to other implementations of the present disclosure. The tasks may be iteratively performed. The technique may begin at 300.

At 302, a mobile device (e.g., the mobile device 12 of FIG. 2) is unlocked by a user. A mobile control module (e.g., the mobile control module 34) may receive an unlock signal and a login ID and/or password from the user via, for example, a display (e.g., the display 132). At 304, the mobile device may transmit a keychain request signal to the server 40 and/or the central computer 24. At 306, the server 40 and/or the central computer 24 may transmit a verification request signal to the mobile device in response to the keychain request signal. The verification request signal may request verification information from the mobile device, such as a username, a password, a pin, and/or other personal, account, or device specific information prior to transmitting a keychain, a key and/or other information to the mobile device. The other information may include user preferences (e.g., the user preferences) stored at the server 40 and/or the central computer 24.

At 308, the mobile device transmits a verification response signal back to the server 40 and/or the central computer 24 in response to the verification request signal. The verification response signal may include information entered by the user and/or stored in the mobile device.

At 310, the server 40 and/or the central computer 24 may transmit (push) one or more keychain(s) and/or key(s) and/or other information to the mobile device. This may occur: each time the mobile device is activated, logged into, the user logs into an account at the server 40 and/or into the central computer 24, and/or when the mobile device is new and used for a first time.

At 310, the server 40 and/or the central computer 24 may permit key sharing by the mobile device. The mobile device may directly share keys and/or keychains received from the server 40 and/or the central computer 24 directly with other mobile devices. The mobile device may share the keys and/or keychains indirectly with other mobile devices by sending a key sharing request to the server 40 and/or central computer 24. The key sharing request may identify, for example, keys and/or keychains selected by the mobile device and IDs of other mobile devices to which the keys and/or keychains are to be shared. The keys and/or keychains may be shared based on a rank of the mobile device sharing the keys and/or keychains. The key sharing request may also indicate key sharing privileges and/or rank of the selected mobile devices. Key sharing may be performed prior to task 210 and using any mobile device and/or computer at which the owner of the locking devices and/or an authorized user with appropriate key sharing privileges is logged into.

The mobile device may be locked, deactivated (powered down), unlocked and/or reactivated (powered up) subsequent to task 310 and prior to tasks 312 and 314. Also, the mobile device may be placed within a NFC distance of the locking device prior to performing tasks 312 and 314. The mobile device may tap or be placed within a NFC distance of a locking device (e.g., the locking device 18 of FIG. 4) to transfer a mobile device identifier and/or a key to the locking device.

At 312, the mobile control module may receive a user input requesting that a physical lock be unlocked and/or attempt to detect the locking device in response to being tapped on the locking device. The user request may include an ID of the lock and/or locking device. When the mobile device is tapped on the locking device or placed within the NFC distance of the locking device, task 314 may be performed instead of task 312.

At 314, the mobile control module when in the NFC distance may detect the lock and/or locking device and determine an appropriate key to unlock a lock of the locking device. As an example, the mobile control module may receive an ID signal from the locking device indicating the ID(s) of the lock and/or locking device. As another example, the mobile control module may read the locking device to acquire the ID(s) of the lock and/or locking device. As yet another example, the locking device may detect the mobile device and/or transmit a request for a key from the mobile device. The request may indicate the ID(s) of the lock and/or locking device.

At 316, prior to sending a key to the locking device, the mobile device may request additional verification information from the user. The keys stored on the mobile device may be, for example, password (or pin) protected and/or protected based on other verification information (examples of which are disclosed herein). At 317, the mobile control module 34 receives verification information from the user via, for example, the display. At 318, the mobile control module 34 and/or an information verification module (e.g., one of the information verification modules 162, 210, 232) determines whether the verification information is correct. The information verification module may transmit the received verification information to the server 40 and/or the central computer 24 and request verification from the server 40 and/or the central computer 24.

If the verification information is not approved, the technique may end at 319. At 320, the mobile device may transfer a unique ID of the mobile device, one or more keys and/or other verification information to the locking device when the additional verification information is approved by the mobile device, the server 40 and/or the central computer 24.

At 321, a lock control module (e.g., the lock control module 200) and/or the information verification module of the locking device verifies the unique ID, the key(s) and/or other verification information received from the mobile device. The information verification module may request verification of this information by the server 40 and/or the central computer 24. The unique ID, key(s) and other verification information may be transmitted from the locking device to the server 40 and/or the central computer 24.

At 322, if the unique ID, the key(s), and/or other verification information received are not valid, the technique may end at 324. At 326, the lock control module may determine a rank of the mobile device based on the verification information received from the mobile device. The verification information received from the mobile device may include a rank. At 328, if the rank is not greater than a predetermined rank (e.g., rank of 1), task 330 may be performed. If the rank is greater than the predetermined rank, task 334 is performed.

At 330, a lock actuation module (e.g., the lock actuation module 208) of the locking device unlocks the lock using the key(s). The technique may end at 332 after unlocking the lock.

At 334, the locking device may request additional verification information from the mobile device. After a key is provided from the mobile devices to a locking device, the locking device or an associated network of the locking device (e.g., vehicle network) may challenge the mobile device. This may occur before or after the locking device unlocks a lock. The additional verification information may include a password, a passcode, a pin or other verification information.

At 336, the mobile device transmits the additional verification information requested at 334. The mobile device may request the additional verification information from the server 40 and/or the central computer 24 prior to transmitting the additional verification information to the locking device. Upon receiving the additional verification information, the mobile device may forward the additional verification information to the locking device.

At 338, the locking device verifies and/or requests verification of the additional verification information by the server 40 and/or the central computer 24, as described above. At 340, the locking device proceeds to task 342 if the additional verification information received at 336 is valid, otherwise the technique may end at 348.

At 342, the lock actuation module unlocks the lock. At 344, the locking device and/or associated network (e.g., the vehicle network or facility network) may establish communication link(s) to communicate with the mobile device, the server 40 and/or the central computer 24. The communication link(s) may include Bluetooth and/or Wi-Fi communication links via which Bluetooth and Wi-Fi protocols are respectively used for communication. The communication links may be established prior to task 344, such as at tasks 320 or 321.

The NFC communication used to unlock the lock may also be used to initiate wireless connections of other communication protocols. For example, when the mobile device is used to unlock a lock on a home or a vehicle, the mobile device may initiate a Wi-Fi or Bluetooth connection to communicate with a home network or a vehicle network (e.g., the networks 72, 92). As an example, a Bluetooth connection may then be used to sink personal or verification information from the mobile device to the vehicle network, such as seat settings, temperature settings, radio settings (e.g., radio station and volume settings), powertrain or suspension settings (e.g., an economy or sport setting), or other vehicle settings. The vehicle network may then adjust settings to match the vehicle settings received from the mobile device. As another example, the locking device may establish a Wi-Fi link with the mobile device, the server 40 and/or the central computer 24 and communicate with and request additional information from the mobile device, the server 40 and/or the central computer 24 for verification purposes.

At 346, the locking device and/or associated network may download user preferences (e.g., the vehicle settings or facility settings) from the mobile device, the server 40 and/or the central computer 24. The technique may end at 348 after performing task 346.

In a vehicle application and subsequent to tasks 330 and 342, the mobile device may request that the locking device unlock a lock on a vehicle door. The locking device unlocks the vehicle door to allow access to an interior of a vehicle. A vehicle network may then request additional information from the mobile device prior to allowing the vehicle to start. If the mobile device does not provide the correct information, the vehicle network may prevent an engine and/or the vehicle from starting and/or transmit a signal to the mobile device, the other mobile device, the server 40 and/or the central computer 24 indicating that an unauthorized device has accessed the vehicle. A second key may need to be provided by the mobile device and verified by the vehicle network to start the vehicle.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, devices, modules and/or servers, these elements, devices, modules and/or servers should not be limited by these terms. These terms may be only used to distinguish one element, device, module and/or server from another elements, devices, modules and/or servers. Terms such as "first," "second," and other numerical terms when used herein do not imply a sequence or order unless clearly indicated by the context. Thus, a first element, device, module and/or server discussed below could be termed a second element, device, module and/or server without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps (or tasks) and instructions described herein in the form of an algorithm. It should be noted that the described process steps (tasks) and instructions could be embodied in software, firmware or hardware, and when embodied in software, could be downloaded to reside on and be operated from different platforms used by real time network operating systems.

The present disclosure also relates to an apparatus(es) and/or system(s) for performing the operations herein. These apparatus(es) and/or system(s) may be specially constructed for the required purposes, or may each comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
storing a plurality of keychains in a memory of one of a computer and a server, wherein each of the keychains is associated with one of a first plurality of mobile devices and comprises a plurality of keys, wherein each of the keys unlocks one or more physical locks;
receiving a login identifier and a password from a first mobile device via a control module of the one of the computer and the server;
verifying the login identifier and the password via the control module;
subsequent to the control module approving the login identifier and the password, downloading one of the plurality of keychains from the one of the computer and the server to the first mobile device, wherein the one of the plurality of keychains comprises N keys, where N is an integer greater than or equal to 1, and wherein each of the N keys is associated with one or more of M physical locks of M locking devices, where M is an integer greater than or equal to 1;
receiving a key sharing request from the first mobile device;
sharing keys of the one of the plurality of keychains with a second plurality of mobile devices based on a rank of the first mobile device and the key sharing request;
monitoring the M locking devices or another locking device not included in the M locking devices via a log update module;
recording information in a key log via a log update module when each of the N keys is used on one of the M locking devices or another locking device by one of the first plurality of mobile devices and the second plurality of mobile devices, wherein the information includes a mobile device identifier, a locking device identifier and a key identifier; and
alerting the first mobile device when each of the N keys is used via an alert module based on the key log including reporting to the first mobile device the mobile device identifier, the locking device identifier and the key identifier.

2. A computer-implemented method comprising:
storing a plurality of keychains in a memory of one of a computer and a server, wherein each of the keychains comprises a plurality of keys, wherein each of the keys is unlocks one or more physical locks;
receiving a login identifier and a password from a first mobile device via a control module of the one of the computer and the server;
verifying the login identifier and the password via the control module;
subsequent to the control module approving the login identifier and the password, downloading one of the plurality of keychains from the one of the computer and the server to the first mobile device, wherein the one of the plurality of keychains comprises N keys, where N is an integer greater than or equal to 1, and wherein each of the N keys is associated with one or more of M physical locks of M locking devices, where M is an integer greater than or equal to 1;
monitoring the M locking devices or another locking device not included in the M locking devices via a log update module;
recording information in a key log via a log update module when each of the N keys is used on one of the M locking devices or another locking device, wherein the information includes a locking device identifier and a key identifier; and
alerting the first mobile device when each of the N keys is used via an alert module based on the key log including reporting to the first mobile device the locking device identifier and the key identifier.

3. The computer-implemented method of claim 2, further comprising:
receiving a request from the first mobile device via one of the computer and the server to transmit one more of the N keys to a second mobile device; and
transmitting the one more of the N keys to the second mobile device via a transceiver of the one of the computer and server.

4. The computer-implemented method of claim 2, further comprising:
requesting verification information from at least one of the first mobile device and the second mobile device; and receiving the verification information from the at least one of the first mobile device and the second mobile device; and transmitting the one or more of the N keys to the second mobile device when the verification information received from the at least one of the first mobile device and the second mobile device is valid.

5. The computer-implemented method of claim 2, further comprising:
   receiving a verification request from one of the M locking devices to verify one of the N keys;
   comparing the one of the N keys to a key stored in the memory; and
   transmitting a verification response signal to the one of the M locking devices indicating whether the one of the N keys is valid.

6. The computer-implemented method of claim 2, further comprising:
   receiving an information signal at the control module from the first mobile device, wherein the information signal requests information previously requested of the first mobile device by one of the M locking devices; and
   transmitting a response signal from the one of the computer and the server to the first mobile device, wherein the response signal includes the information requested of the first mobile device.

7. The computer-implemented method of claim 6, wherein the information requested of the first mobile device comprises at least one of a password, a passcode and a pin.

8. The computer-implemented method of claim 2, further comprising:
   at least one of receiving and storing user preferences in the memory; and
   transmitting notification signals from the one of the computer and the server to the first mobile device based on the user preferences.

9. The computer-implemented method of claim 8, wherein:
   the user preferences comprise log information;
   each of the M locking devices transmit signals to the one of the computer and the server indicating use of the N keys by the first mobile device and the other mobile devices at the M locking devices; and
   the log information indicates statistics related to the use of the N keys by the first mobile device and other mobile devices at the M locking devices, as tracked by the log update module.

10. The computer-implemented method of claim 9, wherein the notification signals are transmitted to the first mobile device when one or more of the N keys are used by one of the other mobile devices.

11. The computer-implemented method of claim 8, wherein the user preferences comprise key update information, wherein the key update information indicates when the N keys are to be updated.

12. The computer-implemented method of claim 8, further comprising:
   receiving alerting criteria from at least one of the first mobile device and the computer;
   tracking the user preferences based on the alerting criteria; and
   transmitting the notification signals based on the alerting criteria.

13. The computer-implemented method of claim 2, further comprising:
   at least one of receiving authorization criteria from the first mobile device and setting authorization criteria via the control module, wherein the authorization criteria indicates the verification information requirements to unlock the M physical locks;
   verifying information received from the one of the M locking devices based on the authorization criteria; and
   transmitting a verification response signal to the one of the M locking devices to unlock one of the M physical locks when the information received is valid.

14. The computer-implemented method of claim 2, further comprising:
   periodically updating the N keys;
   transmitting the N keys to the first mobile device; and
   transmitting the N keys to respective ones of the M locking devices.

15. The computer-implemented method of claim 2, further comprising:
   periodically revoking the N keys; and
   transmitting verification response signals to the M locking devices indicating that respective ones of the N keys have been revoked.

16. The computer-implemented method of claim 2, further comprising:
   receiving a revoke request from the first mobile device to revoke a key provided to another mobile device; and
   transmitting a key update signal to one of the M locking devices indicating that the key provided to another mobile device is invalid.

17. The computer-implemented method of claim 2, further comprising issuing the N keys for the first mobile device with unlimited access.

18. The computer-implemented method of claim 17, further comprising issuing keys with limited access for the M locking devices to mobile devices other than the first mobile device,
   wherein each of the keys with limited access becomes invalid after a respective predetermined access period.

19. The computer-implemented method of claim 2, further comprising:
   providing unlimited key sharing privileges to the first mobile device; and
   providing restricted key sharing privileges to mobile devices other than the first mobile device.

20. The computer-implemented method of claim 2, further comprising:
   receiving a unique identifier and verification request from a second mobile device, wherein the verification request is for at least one of (i) a key of one of the M physical locks and (ii) verification information;
   determining whether the second mobile device is authorized to unlock the one of the M physical locks associated with the and verification request;
   when the second mobile device is authorized, downloading to the second mobile device the at least one of (i) the key for the one of the M physical locks associated with the key request and (ii) the verification information.

21. The computer-implemented method of claim 20, further comprising one of:
   receiving an authorization signal from the first mobile device authorizing the second mobile device to receive the at least one of (i) the key for the one of the M physical locks associated with the key request and (ii) the verification information; and
   transmitting an authorization request signal to the first mobile device requesting whether the second mobile device is authorized to unlock the one of the M physical locks associated with the key request.

22. The computer-implemented method of claim 21, further comprising:
  receiving a signal from the first mobile device authorizing a one-time access key for the one of the M physical locks associated with the key request to be shared with the second mobile device, wherein the one-time access key becomes invalid after being used one time by the second mobile device to unlock the one of the M locks associated with the key request; and
  transmitting the one-time access key to the second mobile device.

* * * * *